United States Patent [19]

Brear

[11] Patent Number: 4,516,549
[45] Date of Patent: May 14, 1985

[54] INTERNAL COMBUSTION ENGINE

[75] Inventor: Frederick Brear, Peterborough, England

[73] Assignee: Massey-Ferguson-Perkins Limited, London, England

[21] Appl. No.: 491,956

[22] PCT Filed: Aug. 4, 1982

[86] PCT No.: PCT/GB82/00241
§ 371 Date: Apr. 4, 1983
§ 102(e) Date: Apr. 4, 1983

[87] PCT Pub. No.: WO83/00531
PCT Pub. Date: Feb. 17, 1983

[30] Foreign Application Priority Data

Aug. 13, 1981 [GB] United Kingdom ............... 8124723

[51] Int. Cl.³ .................... F02N 17/08; F02B 3/06; F02B 3/00
[52] U.S. Cl. .................................... 123/276; 123/262
[58] Field of Search ............... 123/276, 279, 282, 281, 123/285, 262

[56] References Cited

U.S. PATENT DOCUMENTS

| | | | |
|---|---|---|---|
| 2,914,044 | 11/1959 | Liobol | 123/276 |
| 2,959,161 | 11/1960 | Böttger | 123/276 |
| 3,020,898 | 2/1962 | Hardmann | 123/276 |
| 3,144,008 | 8/1964 | List | 123/276 |
| 3,814,068 | 6/1974 | Kimbara et al. | 123/226 |
| 3,954,089 | 5/1976 | Hardesty et al. | 123/276 |
| 4,207,843 | 6/1980 | List et al. | 123/276 |
| 4,378,702 | 1/1983 | Finsterwalder et al. | 123/276 |

FOREIGN PATENT DOCUMENTS 1022415 1/1958 Fed. Rep. of Germany ...... 123/262

Primary Examiner—Raymond A. Nelli
Attorney, Agent, or Firm—Robert L. Farris

[57] ABSTRACT

An internal combustion engine comprising a piston (1) having a recessed combustion bowl (3) with a raised projection (4) in the floor of the bowl so as to define an annulus with the sides of the bowl, swirl means to cause the inlet air to rotate about said raised projection, and a fuel injector (2) having orifices that spray a plurality of jets into the annulus at spaced points around the projection (4), the cross-sectional area of the annulus being such as to vary around the projection (4) and to have a minimum value in a median plane (D—D) through the axis (C) of the projection (4), and the injector nozzle (2) being located in a central region of the bowl (3) and having orifices orientated so as to direct jets of fuel both sides of said median plane. The cross-section area of the annulus is varied by varying the radial width of the annulus, this being achieved conveniently in a circular bowl by offsetting the axis (C) of the projection (4) radially from the axis of the bowl (A). Both axes then lie on the median plane (D—D) through the narrowest part of the annulus. The injector nozzle (2) is also located along the median plane (D—D) and directs fuel jets into the four quadrants of the annulus defined by the median plane (D—D) and perpendicular plane (E—E) through the axis (A) of the bowl (3).

15 Claims, 28 Drawing Figures

INTERNAL COMBUSTION ENGINE

Technical Field

This invention relates to internal combustion engines, especially compression ignition engines.

Direct injection diesel engines are known with pistons having a combustion bowl recessed in the head of the piston and a local raised projection or pip in the floor of the bowl. This pip is located centrally in the bowl and is considered to have a centring action on the fuel-air charge as it enters the bowl. Fuel is injected into the bowl as a number of jets with a conical spray pattern.

It has also been proposed in German Patent No. 1022415 to locate a pip in the floor of a recessed combustion bowl so that the pip is offset from the centre of the bowl and thereby provides an annular venturi that speeds up the flow of air through the narrow part of the annular bowl as it is swirled in the combustion chamber. A fuel injector is provided to inject fuel into this narrow part of the bowl substantially tangentially of the walls of the pip and bowl so as to wet these walls. The accelerated flow of air enhances evaporation of the fuel from the walls, which then mixes further with the air as it flows into the wider part of the bowl.

Direct injection diesel engines are also known with pistons having a recessed combustion bowl that is of a re-entrant form so as to induce turbulence in the flow of the fuel/air mixture in the bowl. This turbulence increases the rate of fuel/air mixing and hence the speed of heat release, thereby allowing the engine to operate at more retarded fuel injection timings without loss in fuel economy and with improved fuel tolerance, with lower NOx emissions and controlled smoke emission. However, the overhanging lip around the mouth of the re-entrant bowl may need to be strengthened.

DISCLOSURE OF THE INVENTION

The present invention aims to provide a direct injection diesel engine having a piston with a recessed combustion chamber adapted to have performance characteristics similar to a re-entrant bowl, but which is inherently stronger in its design.

This object is achieved according to the present invention by providing a piston having a recessed combustion bowl with a raised projection in the floor of the bowl so as to define an annulus with the sides of the bowl, swirl means to cause the inlet air to rotate about said raised projection, and a fuel injector having orifices that spray a plurality of jets into the annulus at spaced points around the projection, the cross-sectional area of the annulus being such as to vary around the projection and to have a minimum value in a median plane through the axis of the projection, and the injector nozzle being located in a central region of the bowl and having orifices orientated so as to direct jets of fuel both sides of said median plane.

Preferably, the cross-setion area of the annulus is varied by varying the radial width of the annulus, this being achieved conveniently in a circular bowl by offsetting the axis of the projection radially from the axis of the bowl. Both axes then lie on the median plane through the narrowest part of the annulus. Preferably, the injector nozzle is also located along the median plane and directs fuel jets into the four quadrants of the annulus defined by the median plane and perpendicular plane through the axis of the bowl.

DESCRIPTION OF THE DRAWINGS

The invention will now be described by way of example with reference to the accompanying drawings in which.

BEST MODE OF CARRYING OUT THE INVENTION

Figure 1:
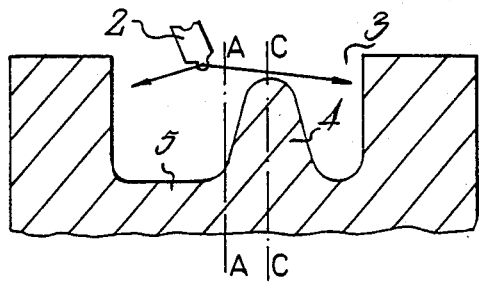
FIG. 1 is an axial section through the crown of a piston and a four hole fuel injector according to the invention.

FIG. 1 shows the crown of a piston 1 and a fuel injector 2 for use in a diesel engine according to the invention. The other components of the engine such as the cylinder block and cylinder head have not been illustrated because these can be standard components into which the piston and injector can be readily fitted by a person of ordinary skill in the art. It will be appreciated that the invention consists in the form of the combustion system comprising the bowl and fuel injection pattern and can be fully described by reference to these components alone.

An open mouthed combustion bowl 3 is formed in the crown of the piston with the axis A of the bowl offset from the axis B of the piston. A raised projection or pip 4 of conical shape is formed in the floor 5 of the bowl and is located with its axis C offset from the axis A of the bowl on the same median plane D—D as axes A and B and on the opposite side of axis B from axis A. The side of the pip 4 is inclined at an angle of 20 degrees to the axis C.

The fuel injector 2 is a four hole injector that produces a spray pattern of four jets lying on a cone over the pip 4. The included cone angle is 150 degrees and the jets are equi-angularly spaced relative to one another. FIG. 1 shows the piston in the top dead centre position relative to the injector 2.

Figure 2:
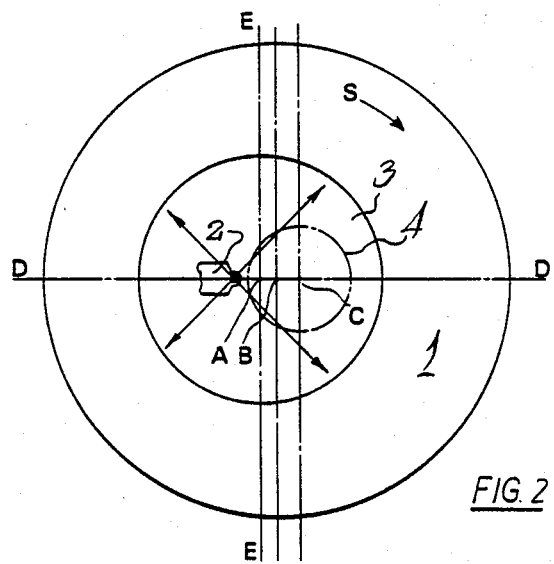
FIG. 2 is a plan view of the piston crown and injector of FIG. 1.

The engine incorporates known means to produce a swirl in the inlet air, this being indicated by the arrow S in FIG. 2, which shows the direction of the swirl.

The performance of this combustion has been investigated using standard tests carried out on one cylinder of a naturally aspirated four cylinder diesel engine of 236 cubic inch capacity and a compression ratio 16:1. The engine incorporates a cylinder head with a helical inlet port that produces a high degree of swirl.

Figure 3:
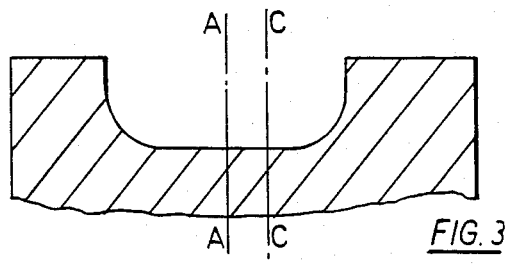
FIG. 3 is an axial section through the crown of a known piston with a recessed combustion bowl.
Figure 4:
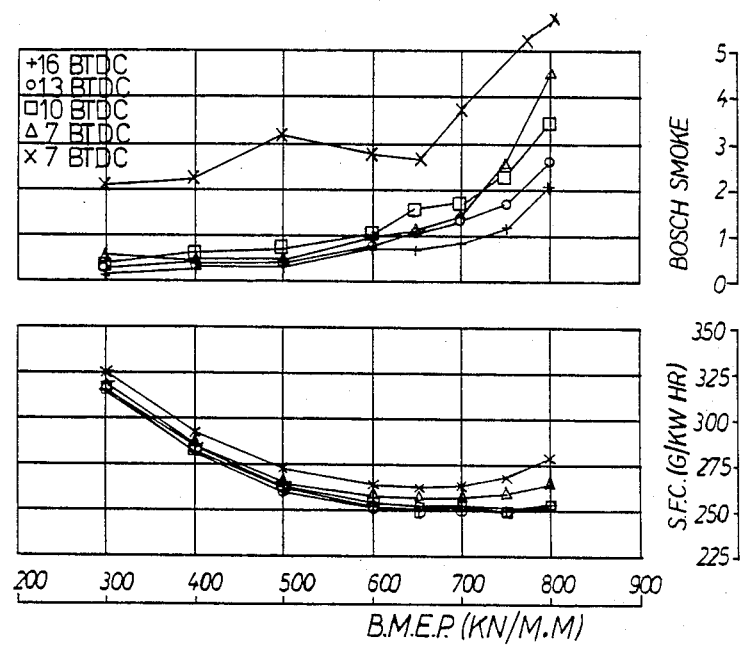
FIG. 4 shows a specific fuel consumption (s.f.c.) and smoke curves for a single cylinder test comparing the combustion system of FIGS. 1 and 2, and that of FIG. 3.

Specific fuel consumption (s.f.c.) and smoke emission were measured over a wide load range at a constant speed of 2000 r.p.m. for four different full load injection timings 16, 13, 10 and 7 degrees B.T.D.C. The measurements taken are displayed by the four lower curves in FIG. 4. For purposes of comparison, the same measurements of specific fuel consumption and smoke were made using the standard recessed bowl for this four cylinder, 236 cubic inch capacity engine, which is shown in FIG. 3. The measurements for a full load injection timing of 7 degrees B.T.D.C. are shown by the upper curve in FIG. 4. These results clearly show that the combustion system of FIGS. 1 and 2 is able to operate at retarded timings such as 10 degrees and 7 degrees B.T.D.C., without suffering any serious degradation in specific fuel consumption or any intolerable increase in smoke when compared with the standard bowl. Thus, the injection timing can be retarded in such an engine to give the associated advantages of lower NOx emissions and lower peak cylinder pressures with the resulting lower noise and improved fuel tolerance.

The effect of varying the fuel spray pattern from that of the combustion system illustrated in FIGS. 1 and 2 has been investigated carrying out similar tests for specific fuel combustion and smoke, and the results are shown in FIGS. 5 to 15.

Figure 5:
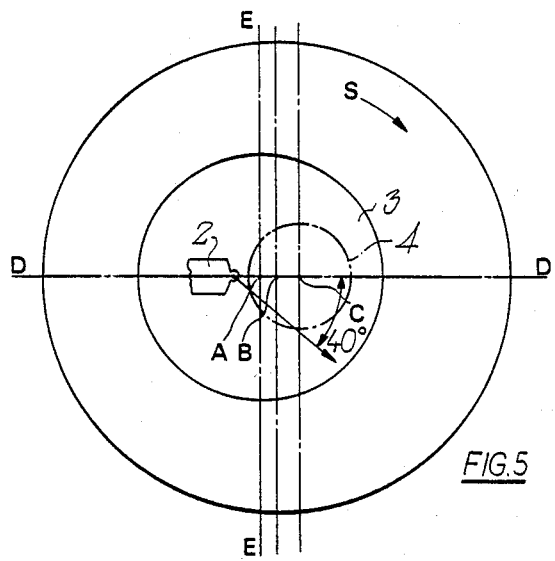
FIG. 5 is a plan view of the piston crown of FIGS. 1 and 2 with a single hole injector.
Figure 6:
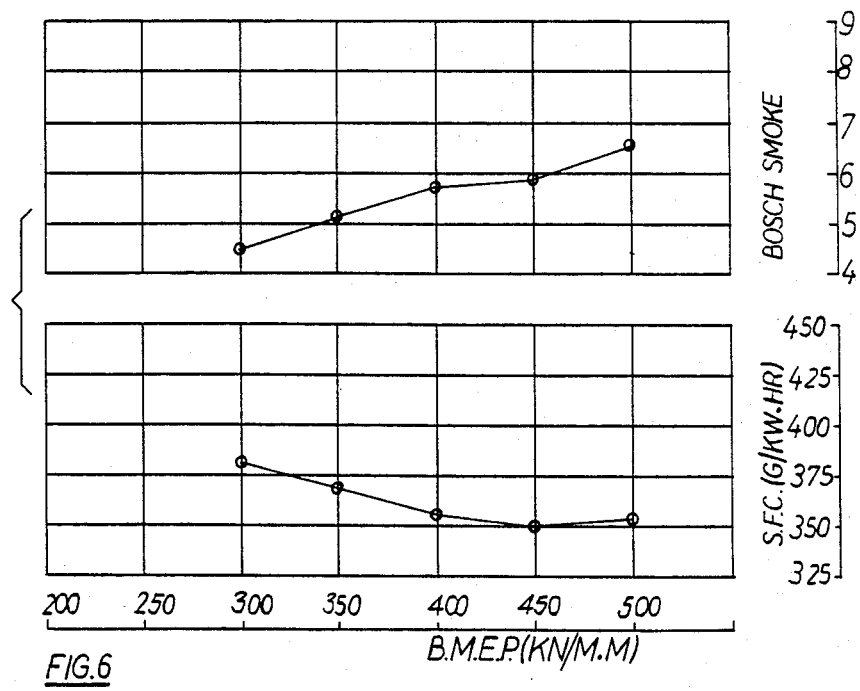
FIG. 6 shows s.f.c. smoke curves for the combustion system of FIG. 5.

FIG. 5 shows that the four hole injector replaced by a single hole injector directing a jet of fuel towards the narrower part of the annular bowl at an angle of 40 degrees to the median plane D—D. The injector hole diameter was 0.6 mm compared with a diameter of 0.32 mm for the four hole injector. The same standard tests for specific fuel consumption and smoke were carried out in the same engine. FIG. 6 shows the results for an injection timing of 15 degrees B.T.D.C. Specific fuel combustion is poor, smoke emissions are high, and, as would be expected, it was found that both deteriorated even further as injection timing was retarded.

Figure 7:
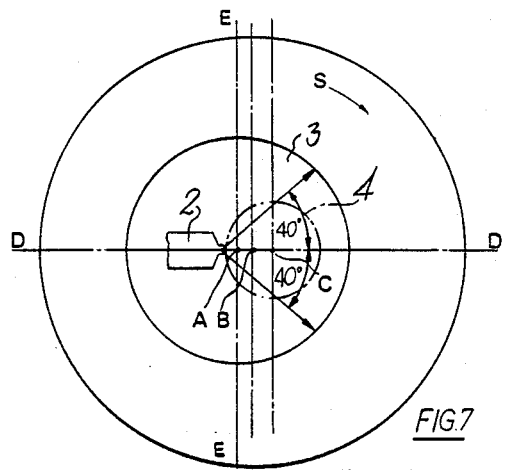
FIG. 7 is a plan view of the piston crown of FIGS. 1 and 2 with a two hole injector directing fuel jets at 40 degrees to the median plane.
Figure 8:
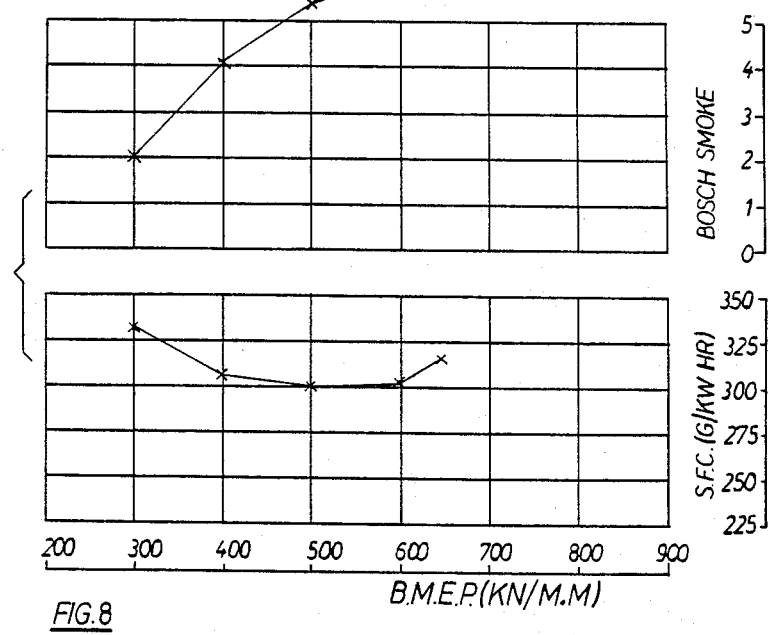
FIG. 8 shows s.f.c. and smoke curves for the combustion system of FIG. 7.

FIG. 7 shows a two hole injector of hole diameter 0.41 mm directing two jets of fuel on a cone of 145 degrees one either side of the projection 4 at angles of 40 degrees to the median plane D—D. Specific fuel consumption and smoke emission test results are shown in FIG. 8. These show that even at the advanced timing of 15 degrees B.T.D.C., specific fuel consumption is poor and smoke emissions high. It can be seen by comparison with FIG. 4 that the performance of the combustion system with this two hole injector is worse than that with the four hole injector of FIGS. 1 and 2.

Figure 9:
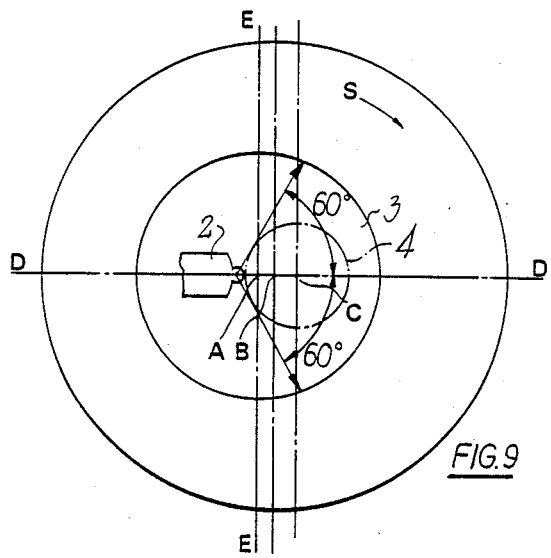
FIG. 9 is a plan view of the piston crown of FIGS. 1 and 2 with a two hole injector, directing fuel jets at 60 degrees to the median plane.
Figure 10:
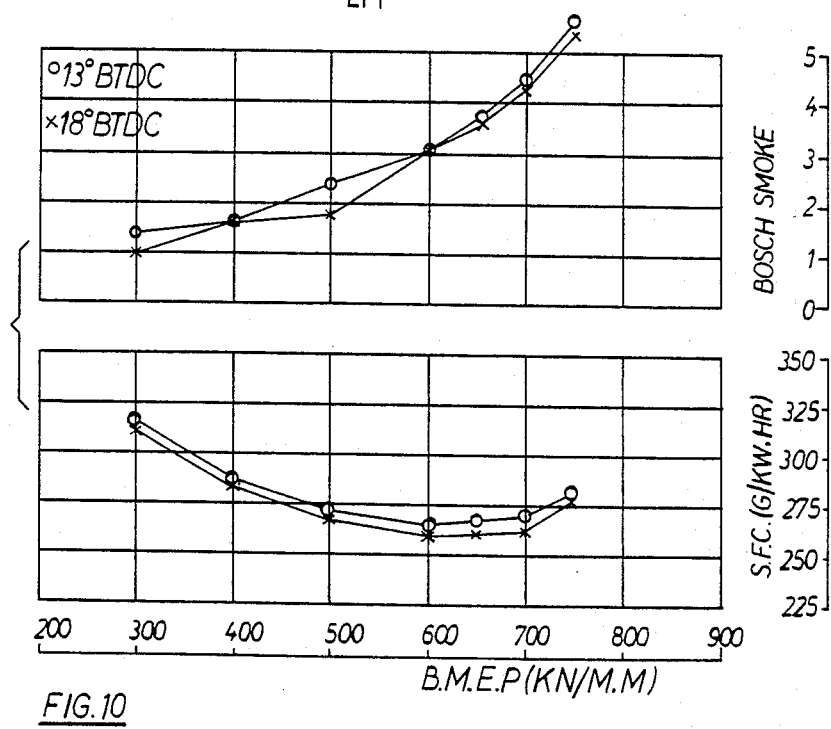
FIG. 10 shows s.f.c. and smoke curves for the combustion system of FIG. 9.

The two hole injector of FIG. 7 was replaced by a similar two hole injector shown in FIG. 9 with the fuel jets set at angles of 60 degrees either side of the median plane D—D. Injector hole diameters of 0.36 mm and 0.45 mm were used and better results were obtained with the smaller diameter. These results are shown in FIG. 10 for full load injection timings of 18 and 13 degrees B.T.D.C. Both specific fuel consumption and smoke have improved compared with the two hole, 40 degrees injector of FIG. 7, but are still worse than the four hole injector of FIGS. 1 and 2.

Figure 11:
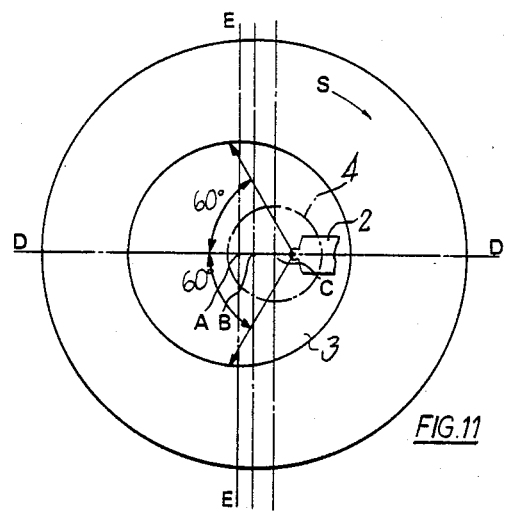
FIG. 11 is a plan view of the combustion system of FIG. 9 with the piston rotated about its longitudinal axis by 180 degrees.
Figure 12:
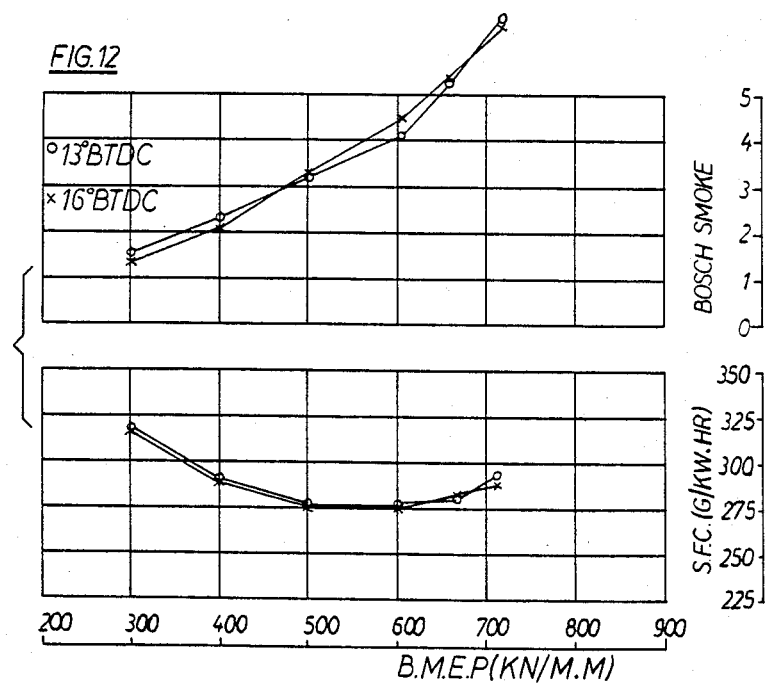
FIG. 12 shows s.f.c. and smoke curves for the combustion system of FIG. 11.
Figure 13:
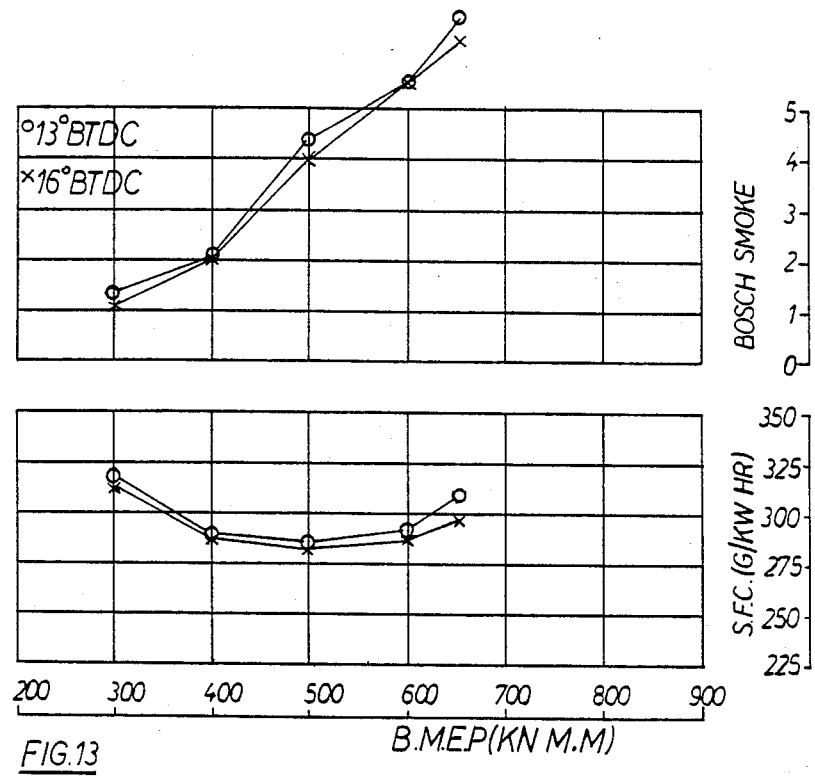
FIG. 13 shows s.f.c. and smoke curves for the combustion system of FIG. 7 with the piston rotated about its longitudinal axis through 180 degrees.

The two hole, 60 degrees injector was employed in another arrangement as shown in FIG. 11 in which the two sprays are directed into the wider part of the annular bowl. This arrangement was conveniently obtained by timing the piston shown in FIG. 8 through 180 degrees, whereupon the relative orientation of the fuel jets and pip 4 becomes that shown in FIG. 11. The test results in FIG. 12 for 16 and 13 degrees B.T.D.C. full load injection timings show worse specific fuel consumption and smoke as compared with the previous two hole, 60 degrees injector results of FIG. 10.

The two hole, 40 degrees injector of FIG. 7 was also employed in this reversed manner by turning the piston through 180 degrees so that the two sprays are directed into the wider part of the annular bowl. The tests results in FIG. 13 for 16 degrees and 13 degrees B.T.D.C. full load injection timings show worse specific fuel consumption and smoke as compared with both combustion systems using the two hole 60 degrees injector of FIGS. 9 to 12, but better than the two hole 40 degrees injector of FIG. 7.

Figure 14:
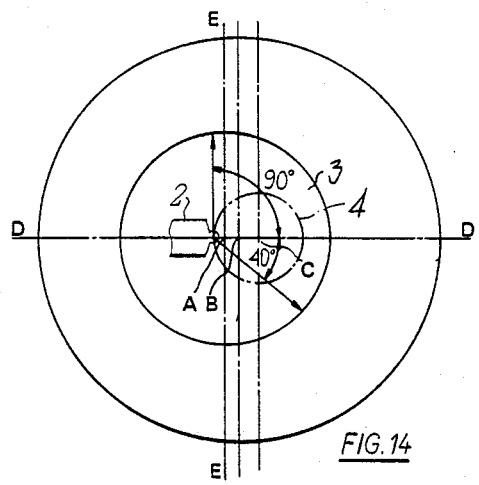
FIG. 14 is a plan view of the piston crown of FIGS. 1 and 2 with another two hole injector directing fuel jets with an included angle of 130 degrees.
Figure 15:
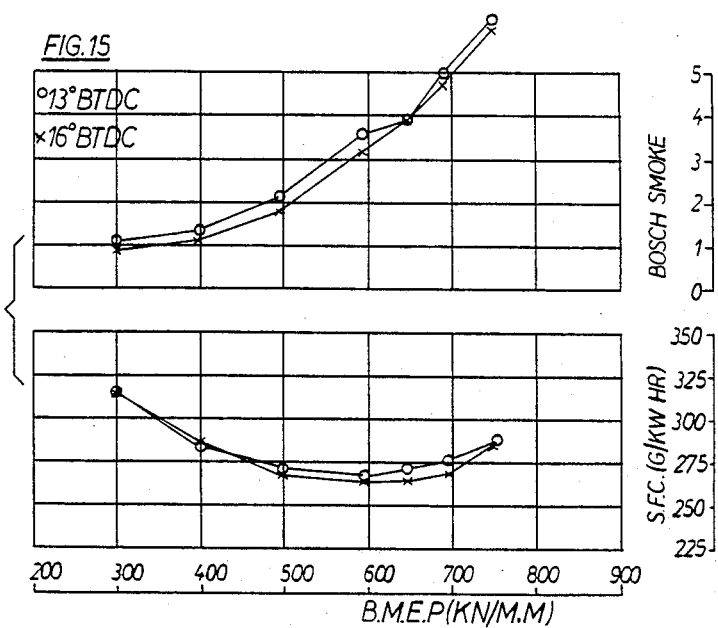
FIG. 15 shows s.f.c. and smoke curves for the combustion system of FIG. 14.

Another two hole injector shown in FIG. 14 was tested, the injector having the one jet directed towards the narrower part of the annular bowl at 40 degrees to the median plane D—D, and the other jet directed perpendicular to the plane D—D and on the opposite side thereof from the first jet. The hole diameter was 0.36 mm. The results shown in FIG. 15 were only slightly worse than those of FIG. 9 for the two hole, 60 degrees injector directing jets towards the narrower part of the annular bowl.

A further set of tests were carried out using a four hole injector with the jets on a 150 degrees spray cone and directed symmetrically about plane D—D with 70 degrees between the two jets directed towards the narrower part of the annular bowl and 110 degrees between the two jets directed towards the wider part of the annular bowl. The specific fuel consumption and smoke tests gave results comparable to those of FIG. 4. However, slightly better results were obtained with the equiangularly spaced jets of FIGS. 1 and 2.

The above test results clearly indicate that inferior performance is achieved with the illustrated combustion bowl if the fuel is injected locally into just one region of the annular space around the pip 4. The characteristics of the air swirling flow in this bowl involving a venturi affect and enhanced turbulance, can only be used to achieve improved engine performance, when the fuel is injected in a more even manner around the pip 4.

The test results indicate that it is advantageous to inject fuel into the annular space of the bowl on both sides of the median plane D—D, the better performance being obtained with more widely diverging jets in twin-jet systems. They also indicate that it is advantageous to inject fuel on both sides of the perpendicular plane E—E so as to feed fuel into both the narrow and wider parts of the annular bowl. The four jet system in which fuel is injected into the four quadrants of the bowl clearly gives the best engine performance results.

Figure 16:
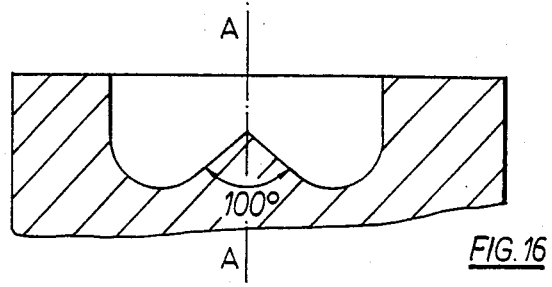
FIG. 16 is an axial section through the crown of a piston incorporating a known toroidal bowl.
Figure 17:
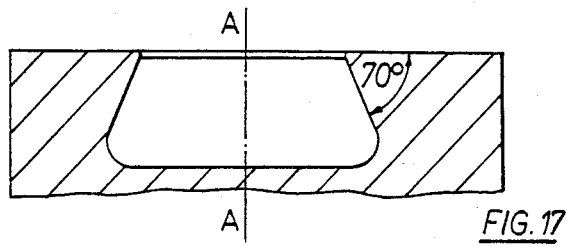
FIG. 17 is an axial section through the crown of a piston incorporating a known squish lip bowl.
Figure 18:
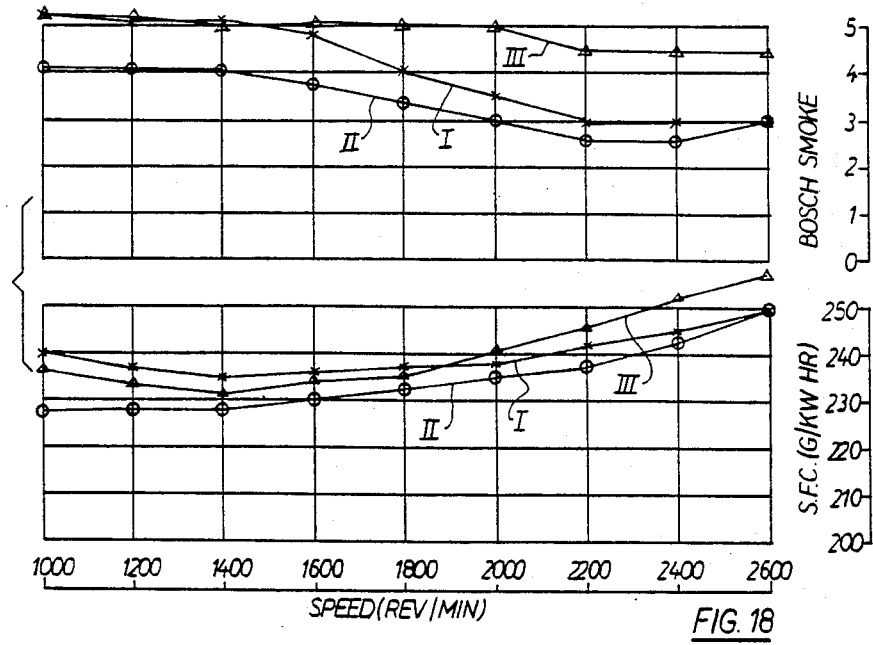
FIG. 18 shows comparative variable speed, s.f.c. and smoke curves for the combustion systems of FIGS. 1 and 2, FIG. 16 and FIG. 17.

The combustion system illustrated in FIGS. 1 and 2 with a four-hole injector with an included spray cone of 140 degrees, has been incorporated in a naturally aspirated, six cylinder diesel engine of compression ratio 15.6:1 and having helical inlet ports to produce a high degree of swirl. Full load, variable speed tests were conducted to measure specific fuel consumption and smoke emissions at an ignition timing of 15 degrees B.T.D.C. Similar tests have also been carried out on the same engine incorporating the known toroidal bowl (see FIG. 16) in one case, and the known re-entrant or squish lip bowl with a side wall inclined at 20 degrees to the bowl axis A (see FIG. 17) in the other case. The results of all three tests are shown for purposes of comparison in FIG. 18. These show that the bowl according to the invention (Curve I) gives similar specific fuel consumption and smoke emission to that of the squish lip bowl (Curve II) at high engine speeds, both being significantly better than the toroidal bowl (Curve III) in each respect.

The specific fuel consumption and smoke emissions of the bowl according to the invention and the squish lip bowl have been measured at a constant speed of 2600 r.p.m. over a range of fuel injection timings so as to compare the performance of the two at retarded timings. The squish lip bowl was similar to that of FIG. 17, but had the side wall inclined at an angle of 40 degrees relative to the axis A of the bowl. This bowl was incorporated in a turbocharged, six cylinder engine of compression ratio 17.5:1 and with tangentially directed inlet ports to produce swirl. A four hole injector with a cone spray angle of 140 degrees and equiangularly spaced jets was used. This engine was known to be suitable for meeting United States Federal Regulations for Diesel Engine Emissions.

Figure 19:
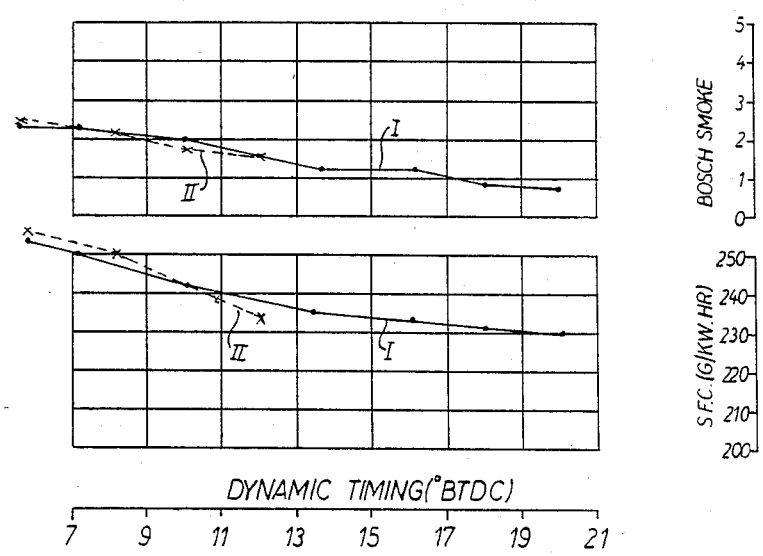
FIG. 19 shows comparative variable injection timing, s.f.c. and smoke curves for the combustion systems of FIGS. 1 and 2 and a squish lip combustion system similar to that of FIG. 17 but with a bowl wall inclined at 40 degrees to the bowl axis.

The results plotted in FIG. 19 confirm that this squish lip combustion system can operate at retarded ignition timings with low specific fuel consumption and smoke emissions (Curve II). Comparable tests carried out on the combustion system of FIGS. 1 and 2 in the same turbo-charged, six cylinder engine at the lower compression ratio of 15.6:1, show that this combustion system performs equally as well at these retarded injection timings (Curve I).

Figure 20:
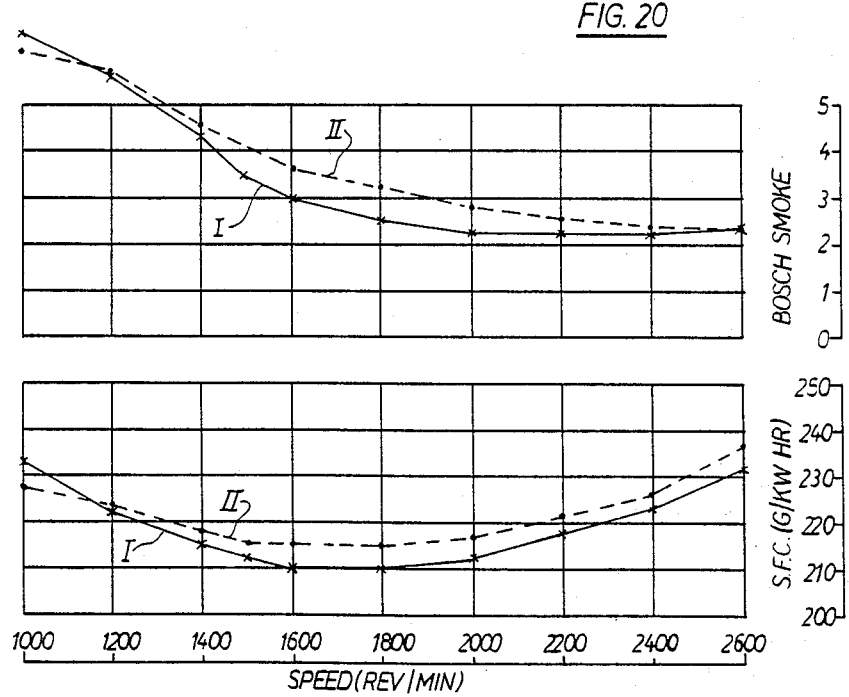
FIG. 20 shows s.f.c. and smoke tests results for the combustion system of FIGS. 1 and 2 and the same system with the pip centred on the bowl axis.

The advantage of locating the pip 4 so that its axis C is offset radially from the axis A of the bowl 3, can be demonstrated by comparative tests with the same combustion system having a centred pip. The above turbocharged engine with a compression ratio of 15.6:1 and injection timing 15 degrees B.T.D.C. was used for this test and specific fuel consumption and smoke results for the offset (Curve I) and centred pips (Curve II) obtained as shown in FIG. 20. These results clearly demonstrate the lower specific fuel consumption and smoke emission with the pip offset radially from the centre of the bowl.

The degree of radial offset of the pip 4 in FIG. 1 is about 14% of the diameter of the bowl. This has been determined as a substantially optimum degree of offset. A smaller degree of offset tends to give increased smoke under light load conditions at higher engine speeds, whilst larger offsets tend to give increased smoke at lower speeds. A wide range of radial offsets have been tested, and from the results, the range 10 to 20% of bowl diameter has been determined to be preferable.

Figure 21:
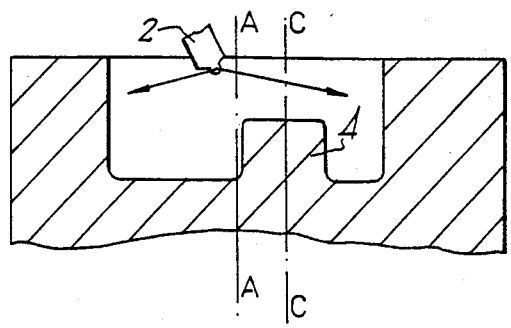
FIG. 21 is an axial section through the crown of the piston and injector according to another embodiment of the invention.
Figure 22:
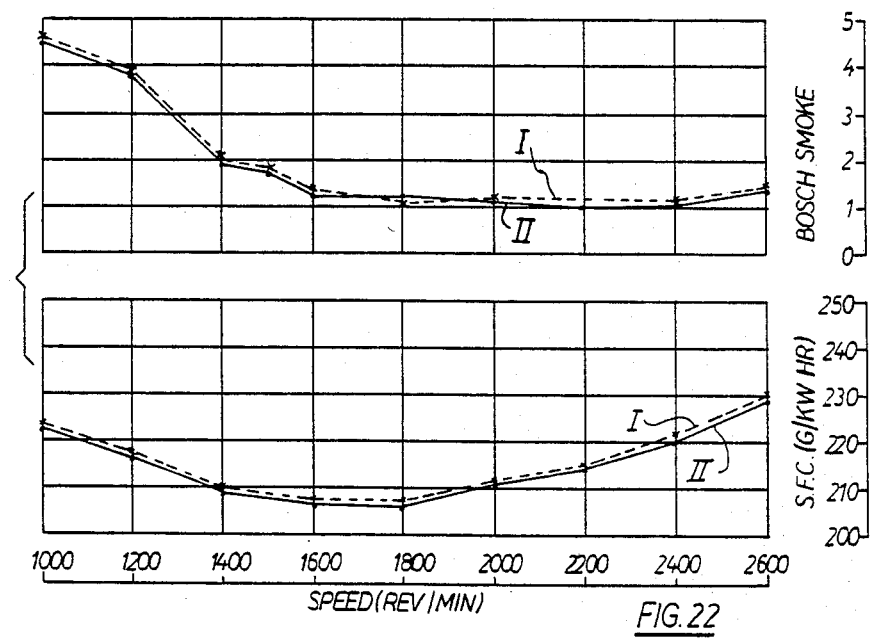
FIG. 22 shows s.f.c. and smoke test results for the combustion system of FIGS. 1 and 2 and FIG. 21.

The shape of the pip 4 has also been varied. A cylindrical sided pip, as shown in FIG. 21, has been found to give equally acceptable performance results. The combustion system of FIG. 21 was tested in the turbo-charged engine as before, and FIG. 22 shows the results (Curve I) compared with those for the combustion system of FIGS. 1 and 2 (Curve II).

The cylindrical pip of FIG. 21 is shorter than the conical pip of FIG. 1 but still has a height in excess of 40% of the bowl depth, this being considered a desirable lower limit for pip height.

Figure 23:
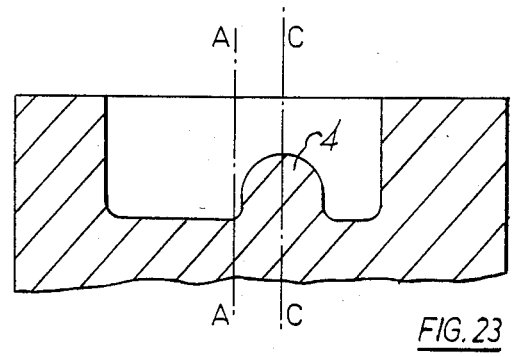
FIG. 23 shows an axial section through the crown of a piston and injector according to yet another embodiment of the invention.

The cylindrical pip of FIG. 21 also has a flat top, but round-topped pips such as that shown in FIG. 23 are equally acceptable.

Figure 24:
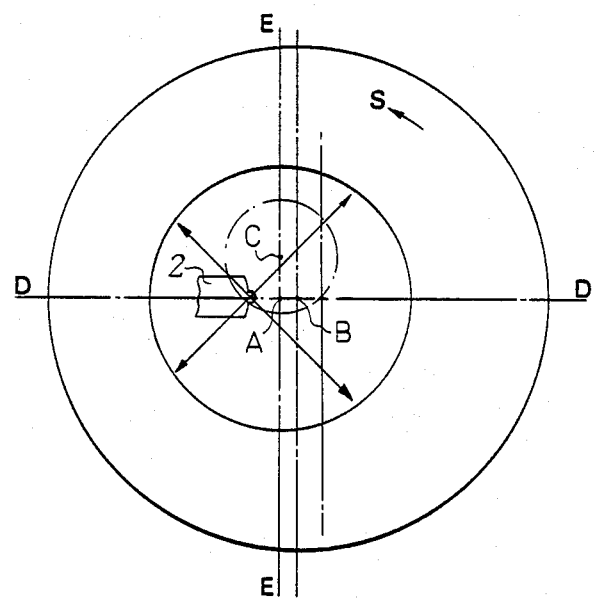
FIG. 24 is a plan view of the crown of a piston and injector according to yet another embodiment of the invention.
Figure 25:
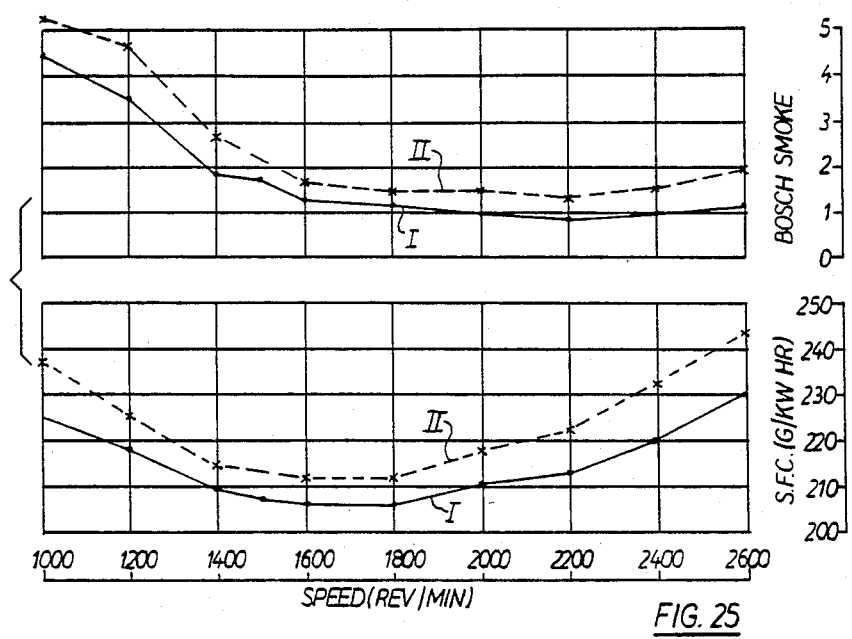
FIG. 25 shows s.f.c. and smoke test results for the combustion systems of FIGS. 21 and 24.

In all of the combustion systems considered above, the axis C of the pip 4, the axis A of the bowl, and the injector nozzle 2 are all aligned on the same median plane D—D. The effect of locating the pip axis C and the injector nozzle 2 in different planes has been tested and performance has been found to be worse compared with a common plane alignment. The combustion system of FIG. 21 was used and the pip 4 moved to one side of the median plane D—D so that its axis C lay on the plane E—E through the bowl axis A perpendicular to the median plane D—D, as shown in FIG. 24. The radial offset between the axes A and C was kept the same. Comparative test results were obtained for the combustion system of FIGS. 21 (Curve I) and 24 (Curve II) and these are shown in FIG. 25. It is clear that locating the pip away from the plane D—D of the injector 2 and bowl axis A causes an increase in specific fuel consumption and smoke emission.

Figure 26:
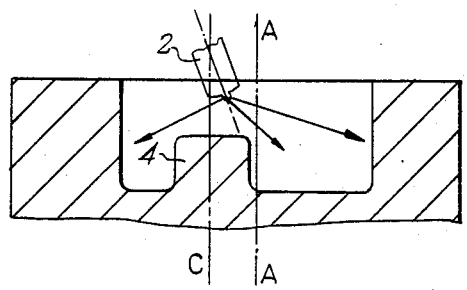
FIG. 26 is an axial section through the crown of the piston and injector according to another embodiment of the invention.

FIG. 26 shows a combustion system employing a bowl with a cylindrical pip 4 like that of FIG. 21, but with the injector located above the pip by rotating the cylinder through 180 degrees from the position shown in FIG. 21. This combustion system was tested in the turbo-charged engine as before, using the four-hole injector with equiangularly spaced jets on a 140 degree spray cone, and the results are shown by curve I in FIG. 28.

Figure 28:
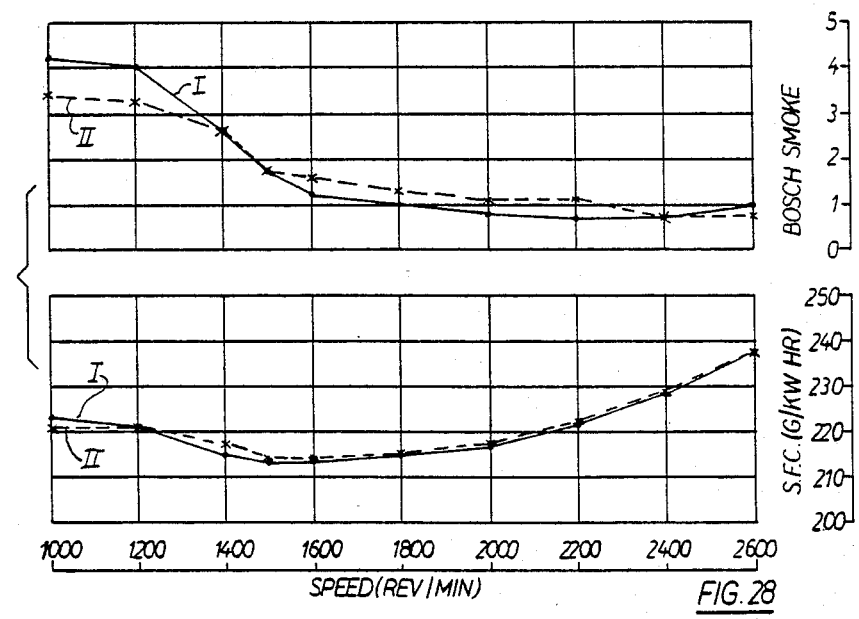
FIG. 28 shows s.f.c. and smoke test results for the combustion systems of FIGS. 24 and 25.
Figure 27:
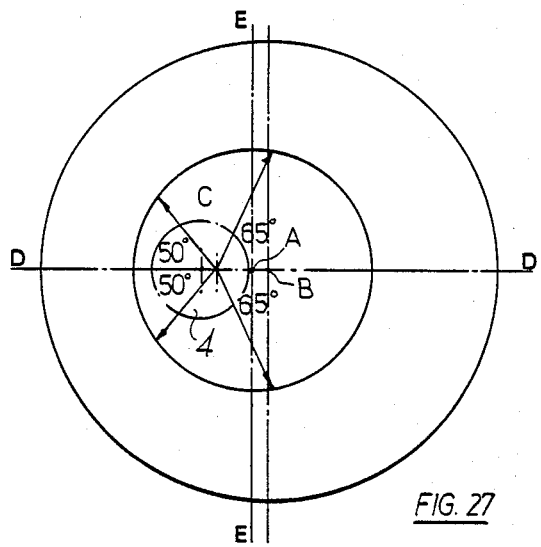
FIG. 27 is a plan view of the combustion system of FIG. 24 but with the four hole injector replaced by a five hole injector.

The combustion system of FIG. 26 was also subject to the same tests using a five-hole injector or nozzle 2 located above the cylindrical pip 4 with the five fuel jets lying on a cone with an included angle 150 degrees and orientated as shown in FIG. 27, with one jet in the median plane D—D directed towards the wider part of the bowl and the other jets directed as pairs either side of the median plane, one pair being inclined at 65 degrees to the median plane and the other at 50 degrees to the median plane. The test results are also shown in FIG. 28 by the curve II. These show that the five-hole injector gives both improved specific fuel consumption and smoke at low speeds.

I claim:

1. An internal combustion engine comprising a piston having a recessed combustion bowl with a raised projection in the floor of the bowl so as to define an annulus with the sides of the bowl, swirl means to cause the inlet air to rotate about said raised projection, and a fuel injector having orifices that spray a plurality of jets into the annulus at spaced points around the projection, characterised in that the cross-sectional area of the annulus varies around the projection (4) and has a single minimum value in a median plane (D—D) through the axis (C) of the projection (4), the centre (A) of the bowl (3) and the centre of the injector nozzle (2); and the injector nozzle (2) is located on the opposite side of the axis (C) from the minimum value cross-sectional area of the annulus and has orifices orientated so as to direct jets of fuel both sides of said median plane (D—D).

2. An internal combustion engine comprising a piston having a recessed combustion bowl with a raised projection in the floor of the bowl so as to define an annulus with the sides of the bowl, swirl means to cause the inlet air to rotate about said raised projection, and a fuel injector having orifices that spray a plurality of jets into the annulus at spaced points around the projection, characterised in that the cross-sectional area of the annulus varies around the projection (4) and has a single minimum value in a median plane (D—D) through the axis (C) of the projection (4), the centre (A) of the bowl (3) of the centre of the injector nozzle (2) is located on the opposite side of the axis (C) from the minimum value cross-sectional area of the annulus; and has orifices orientated so as to direct jets of fuel both sides of a plane (E—E) through the axis A of the bowl (3) perpendicular to said median plane.

3. An engine as claimed in claim 1 in which the injector orifices are orientated to direct jets of fuel both sides of a plane (E—E) through the centre (A) of the bowl (3) perpendicular to said median plane (D—D).

4. An engine claimed in claim 3 in which the injector has four orifices each of which is orientated to direct a jet of fuel into a respective quadrant defined by said median (D—D) and perpendicular (E—E) planes.

5. An engine as claimed in claim 1 in which the radial spacing between the periphery of the projection (4) and the sides of the bowl (3) varies around the axis (C) of the projection.

6. An engine as claimed in claim 5 in which the axis (C) of the projection (4) is offset radially from the axis (A) of the bowl (3).

7. An engine as claimed in claim 6 in which the bowl (3) and projection (4) are both circular in a section taken perpendicular to their axes (A, C), and both axes lie in said median plane (D—D).

8. An engine as claimed in claim 7 in which the axis (C) of the projection (4) is offset from the axis (A) of the bowl (3) by between 10 and 20 percent of the bowl diameter.

9. An engine as claimed in claim 1 in which the nozzle of the injector (2) is located on said median plane (D—D).

10. An engine as claimed in claim 1 in which the nozzle of the injector (2) is located in substantial alignment with the axis (C) of the projection (4).

11. An engine as claimed in claim 1 in which the projection (4) has a tapered side wall inclined at an angle of 20 degrees or less to the axis (C) of the projection.

12. An engine as claimed in claim 1 in which the projection (4) has a cylindrical side wall parallel to the axis (C) of the projection.

13. An engine as claimed in claim 1 in which the projection (4) has a flat top.

14. An engine as claimed in claim 1 in which the projection (4) has a rounded top.

15. An engine as claimed in claim 1 in which the projection (4) has a height of at least 40% of the depth of the bowl (3).

* * * * *